US008162613B2

(12) United States Patent
Oleson et al.

(10) Patent No.: US 8,162,613 B2
(45) Date of Patent: Apr. 24, 2012

(54) ANGLED AIRFOIL EXTENSION FOR FAN BLADE

(75) Inventors: Richard A. Oleson, Lexington, KY (US); Richard M. Aynsley, Lexington, KY (US); Dale R. Jury, Richmond, KY (US)

(73) Assignee: Delta T Corporation, Lexington, KY (US)

( * ) Notice: Subject to any disclaimer, the term of this patent is extended or adjusted under 35 U.S.C. 154(b) by 1092 days.

(21) Appl. No.: 12/038,873

(22) Filed: Feb. 28, 2008

(65) Prior Publication Data

US 2008/0213097 A1 Sep. 4, 2008

Related U.S. Application Data

(60) Provisional application No. 60/892,339, filed on Mar. 1, 2007.

(51) Int. Cl.
*B64C 99/00* (2010.01)

(52) U.S. Cl. ..................... 416/210 R; 416/228; 416/235

(58) Field of Classification Search .............. 416/146 R, 416/210 R, 211, 219 R, 228, 235
See application file for complete search history.

(56) References Cited

U.S. PATENT DOCUMENTS 871,729 A * 11/1907 McChord, Jr. ................ 416/207
1,041,913 A 10/1912 Tyson
2,014,032 A 9/1935 Sharpe et al.
3,524,712 A 8/1970 Petrie et al.
3,721,507 A * 3/1973 Monteleone .............. 416/223 R
4,174,924 A * 11/1979 Smithson, Jr. ............ 416/132 A
4,248,572 A * 2/1981 Fradenburgh ................. 416/228
4,324,530 A * 4/1982 Fradenburgh et al. ......... 416/228
4,334,828 A * 6/1982 Moffitt .......................... 416/228
4,662,823 A * 5/1987 Cooke ............................ 416/23
4,722,608 A * 2/1988 Salzman et al. ........... 366/330.5
4,968,216 A 11/1990 Anderson et al.
5,226,783 A 7/1993 Mita
5,320,494 A * 6/1994 Reinfelder et al. ........... 416/226
5,564,901 A 10/1996 Moore
5,725,355 A 3/1998 Crall et al.
5,823,480 A 10/1998 La Roche
5,885,059 A * 3/1999 Kovalsky et al. ............. 416/224
6,039,541 A 3/2000 Parker et al.
6,106,235 A * 8/2000 Tettenborn et al. ....... 416/229 R
6,161,797 A 12/2000 Kirk et al.

(Continued)

FOREIGN PATENT DOCUMENTS

DE 3 819 145 12/1989

(Continued)

OTHER PUBLICATIONS

U.S. Appl. No. 60/892,339, Mar. 1, 2007, Oleson.

(Continued)

*Primary Examiner* — Edward Look
*Assistant Examiner* — Christopher R Legendre
(74) *Attorney, Agent, or Firm* — Frost Brown Todd LLC

(57) ABSTRACT

An angled fan blade extension includes an attachment portion and an angled portion. The attachment portion is configured to facilitate securing the angled fan blade extension to the distal end of a fan blade. The angled portion is configured to extend from the distal end of the attachment portion, creating an angled extension relative to the fan blade. Adding angular fan blade extensions to fan blades may improve the airflow control, and thereby increase the utility and efficiencies of a fan.

12 Claims, 7 Drawing Sheets

U.S. PATENT DOCUMENTS

| | | | |
|---|---|---|---|
| 6,244,821 | B1 | 6/2001 | Boyd et al. |
| 6,334,705 | B1 * | 1/2002 | Weetman .................. 366/330.1 |
| 6,517,315 | B2 | 2/2003 | Belady |
| 6,565,320 | B1 | 5/2003 | Surls et al. |
| 6,719,533 | B2 | 4/2004 | Bird |
| 6,776,578 | B2 | 8/2004 | Belady |
| 6,884,034 | B1 | 4/2005 | Parker et al. |
| 6,939,108 | B2 | 9/2005 | Boyd |
| 7,252,478 | B2 | 8/2007 | Aynsley |
| 7,284,960 | B2 | 10/2007 | Aynsley |
| 2002/0182071 | A1 * | 12/2002 | Belady .......................... 415/220 |
| 2003/0095864 | A1 | 5/2003 | Ivanovic |
| 2006/0104812 | A1 * | 5/2006 | Kovalsky et al. ............... 416/87 |
| 2006/0187750 | A1 * | 8/2006 | Aldrich et al. ................ 366/270 |
| 2008/0008596 | A1 | 1/2008 | Aynsley |
| 2008/0014090 | A1 | 1/2008 | Aynsley et al. |

FOREIGN PATENT DOCUMENTS

| | | |
|---|---|---|
| EP | 1 619 391 | 1/2006 |
| GB | 100 134 | 3/1917 |
| GB | 946 794 | 1/1964 |
| GB | 2 050 530 | 1/1981 |
| GB | 2 198 190 | 6/1988 |
| WO | WO 2006/022812 | 3/2006 |

OTHER PUBLICATIONS

U.S. Appl. No. 60/972,890, filed Sep. 17, 2007, Oleson.
U.S. Appl. No. 60/975,230, filed Sep. 26, 2007, Scherer et al.
U.S. Appl. No. 60/978,860, filed Oct. 10, 2007, Aynsley et al.
U.S. Appl. No. 61/025,852, filed Feb. 4, 2008, Toy.
U.S. Appl. No. 11/046,593, filed Jan. 28, 2005, Aynsley.
U.S. Appl. No. 11/777,344, filed Jul. 13, 2007, Aynsley.
U.S. Appl. No. 11/858,360, filed Sep. 20, 2007, Aynsley.
U.S. Appl. No. 11/860,888, filed Sep. 25, 2007, Aynsley et al.
A Fan for All Seasons, Bell &Howell Information and Learning, American Society of Mechanical Engineers; Mechanical Engineering, vol. 21(12) (Dec. 1999) pp. 58-60.
"Airfoil Design," HVLS, dated Dec. 9, 2002.
Boeing 747-400 Twin-Aisle Jet Airliner, USA Screenshot from http://www.aerospacetechnology.com/projects/747/7473.html, printed on Aug. 11, 2008.
"Dairy Notes," University of California Cooperative Extension (May 1999).
European Search Report dated Aug. 21, 2006 for Application No. EP 05250653.
European Search Report dated Aug. 22, 2006 for Application No. EP 05250654.
European Search Report dated Jul. 1, 2008 for Application No. EP 05250632.
European Search Report dated Jul. 1, 2008 for Application No. EP 05250653.
European Search Report dated Jul. 1, 2008 for Application No. EP 05250654.
Fairbank et al., "A Large Paddle Fan for Livestock Cooking," Canadian Society of Agricultural Engineering (Jun. 1989).
General Exterior Arrangement 737, Screenshot from http://www.boeing.com/commercial/737family/pf/pf_exterior.html, printed on Aug. 11, 2008.
International Search Report and Written Opinion dated Aug. 19, 2005 for Application No. PCT/US05/02703.
Jain et al., "Experimental Investigation of the Flow Field of a Ceiling Fan," ASME Heat Transfer/Fluids Engineering Summer Conference, Paper No. HT-FED-2004-56226 (Jul. 2004).
KC-135A in flight—closeup of winglet with attached tufts, Screenshot from http://www.dfrc.nasa.gov/gallery/Photo/KC-135/Small/EC79-11481jpg, printed on Aug. 11, 2008.
KC-135A in flight—winglet study, EC79-11314, Screensho from http://www.dfrc.nasa.gov/gallery/Photo/KC-135/Small/EC79-11314.jpg, printed on Aug. 11, 2008.
KC-135A in flight—winglet study, EC79-11484, Screenshot from http://dfrc.nasa.gov/gallery/Photo/KC-135/Small/EC79-11484.jpg, printed Aug. 11, 2008.
Montoya, L.C., KC-135 Winglet Flight Results, NASA Dryden Flight Research Center, pp. 145-156.
NASA Dryden Technology Facts—Winglets, Screenshot from http://www.nasa.govicenters/dryden/about/Organizations/Technology/Facts/TF-2004-15-D, printed on Aug. 11, 2008.
Screenshots from www.b737.org.uk, relating winglets, printed May 2004.
Screenshots from oea.larc.nasa.gov, relating to winglets, printed May 2004.
Screenshots from Penn State Engineering website, relating to winglets, printed May 2004.
"Technical Guide: Commercial Industrial & Special Application Ceiling Fans," publisher and date unknown.
Winglet Detail, Screenshot from http://upload.wikimedia.org/wikipedia/commons/5/53/Wingletdetail.jpg, printed on Aug. 11, 2008.
Image: Winglet and nav light arp.jpg, Screenshot from http://en.wikipedia.org/wiki/Image:Winglet_and_nav_light_arp.jpg, printed Aug. 11, 2008.
747-400, Screenshot from http://www.boeing.com/commercial/747family/pf/pf_exterior.html, printed on Aug. 11, 2008.
International Search Report, completion dated Jun. 24, 2008 for Application No. PCT/US2008/055266.
Written Opinion dated Jan. 7, 2008 for Application No. PCT/US2008/055266.

* cited by examiner

ANGLED AIRFOIL EXTENSION FOR FAN BLADE

PRIORITY

This applications claims priority from the disclosure of U.S. Provisional Patent Application Ser. No. 60/892,339, having the same title, filed on Mar. 1, 2007, which is incorporated by reference herein.

BACKGROUND

A variety of fan systems have been made and used over the years in a variety of contexts. For instance, various ceiling fans are disclosed in U.S. Pat. No. 7,284,960; U.S. Pat. No. 6,244,821; and U.S. Pat. No. 6,939,108. The disclosures of each of those U.S. patents are incorporated by reference herein. Another exemplary fan is disclosed in U.S. patent application Ser. No. 11/858,360, entitled "FAN BLADES," filed Sep. 20, 2007, the disclosure of which is also incorporated by reference herein. Alternatively, any other suitable fans may be used in conjunction with versions described herein.

The outer tip of a fan blade or airfoil may be finished by the addition of an aerodynamic tip or winglet. Merely exemplary winglets are described in U.S. Pat. No. 7,252,478, the disclosure of which is incorporated by reference herein. Additional winglets are described in U.S. Non-Provisional patent application Ser. No. 11/860,888, entitled "CUFFED FAN BLADE MODIFICATIONS," filed Sep. 25, 2007, the disclosure of which is incorporated by reference herein. In other variations, an angled extension may be added to a fan blade or airfoil, such as the angled fan blade extensions described in U.S. Provisional Patent Application Ser. No. 60/892,339, entitled "ANGLED AIRFOIL EXTENSION FOR FAN BLADE," filed Mar. 1, 2007, the disclosure of which is incorporated by reference herein. Other suitable structures that may be associated with an outer tip of an airfoil or fan blade will be apparent to those of ordinary skill in the art. Alternatively, the outer tip of an airfoil or fan blade may be simply closed, or may lack any similar structure at all.

The interface of a fan blade and a fan hub may also be provided in a variety of ways. For instance, an interface component is described in U.S. Provisional Patent Application Ser. No. 60/975,230, entitled "AERODYNAMIC INTERFACE COMPONENT FOR FAN BLADE," filed Sep. 26, 2007, the disclosure of which is incorporated by reference herein. Alternatively, the interface of a fan blade and a fan hub may include any other component or components, or may lack any similar structure at all.

Fans may also include a variety of mounting structures. For instance, a fan mounting structure is disclosed in U.S. Provisional Patent Application Ser. No. 60/972,890, entitled "CEILING FAN WITH ANGLED MOUNTING," filed Sep. 17, 2007, the disclosure of which is incorporated herein. In addition, a fan may include sensors or other features that are used to control, at least in part, operation of a fan system. For instance, such fan systems are disclosed in U.S. Provisional Patent Application Ser. No. 60/978,860, entitled "CEILING FAN WITH CONCENTRIC STATIONARY TUBE AND/OR SAFETY FEATURES," filed Oct. 10, 2007, the disclosure of which is incorporated by reference herein; U.S. Provisional Patent Application Ser. No. 61/025,852, entitled "AUTOMATIC CONTROL SYSTEM FOR CEILING FAN BASED ON TEMPERATURE DIFFERENTIALS," filed Feb. 4, 2008, the disclosure of which is incorporated by reference herein; and U.S. Provisional Patent Application Ser.

No. 60/014,948, entitled "AUTOMATIC CONTROL SYSTEM TO MINIMIZE OSCILLATION IN CEILING FANS," filed Dec. 19, 2007, the disclosure of which is incorporated by reference herein. Alternatively, any other suitable mounting structures and/or fan systems may be used in conjunction with versions described herein.

It may also be desirable in some settings for the output airflow from a fan to spread outward across a relatively broad area rather than being concentrated in a vertical column below the fan.

While a variety of components and features have been incorporated into fans and fan systems, it is believed that no one prior to the inventor has made or used the invention described in the appended claims.

BRIEF DESCRIPTION OF THE DRAWINGS

The accompanying drawings incorporated in and forming a part of the specification illustrate several aspects of the present invention, and together with the description serve to explain the principles of the invention; it being understood, however, that this invention is not limited to the precise arrangements shown. In the drawings, like reference numerals refer to like elements in the several views. In the drawings.

Reference will now be made in detail to the present preferred version of the invention, an example of which is illustrated in the accompanying drawings.

DETAILED DESCRIPTION

The following description of certain examples of the invention should not be used to limit the scope of the present invention. Other examples, features, aspects, versions, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

Figure 1:
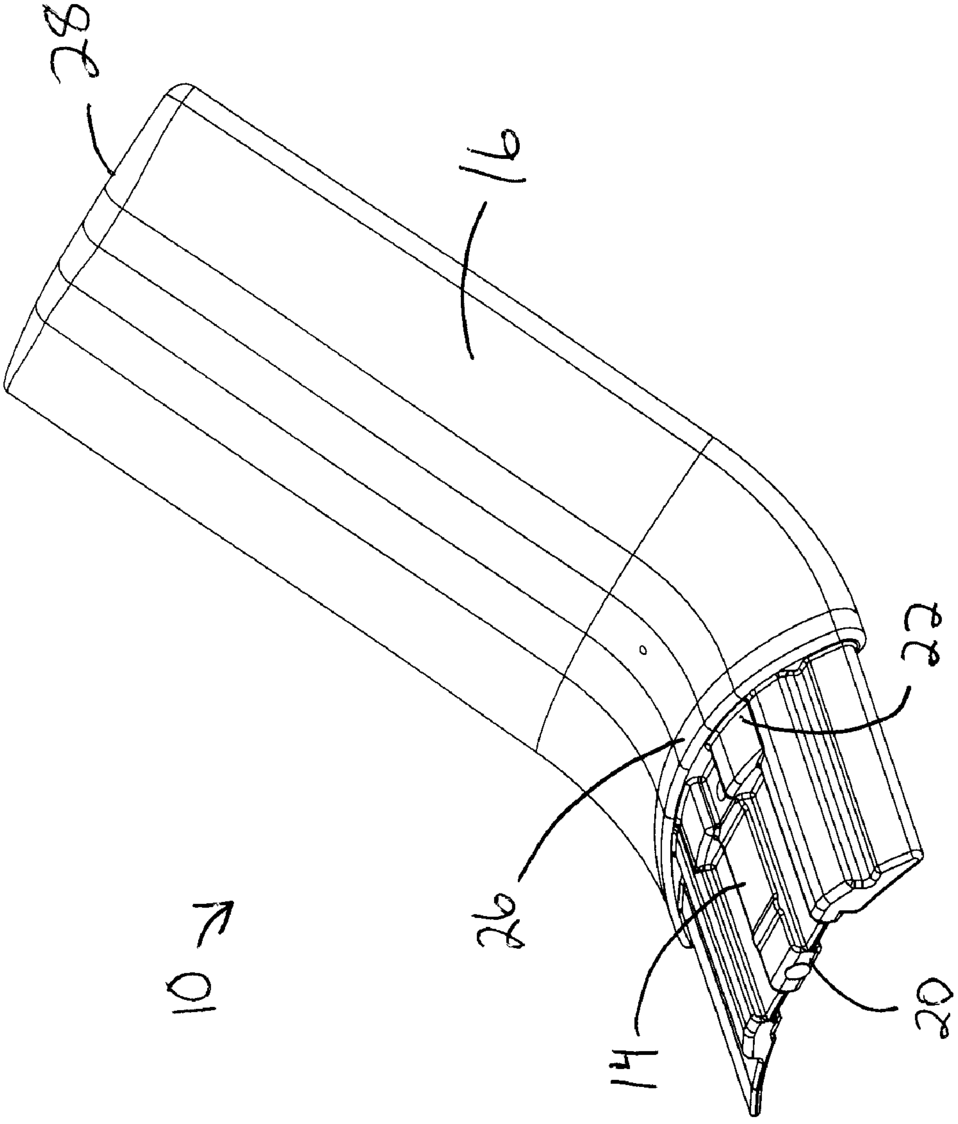
FIG. 1 is a perspective view of an exemplary angled fan blade extension.
Figure 2:
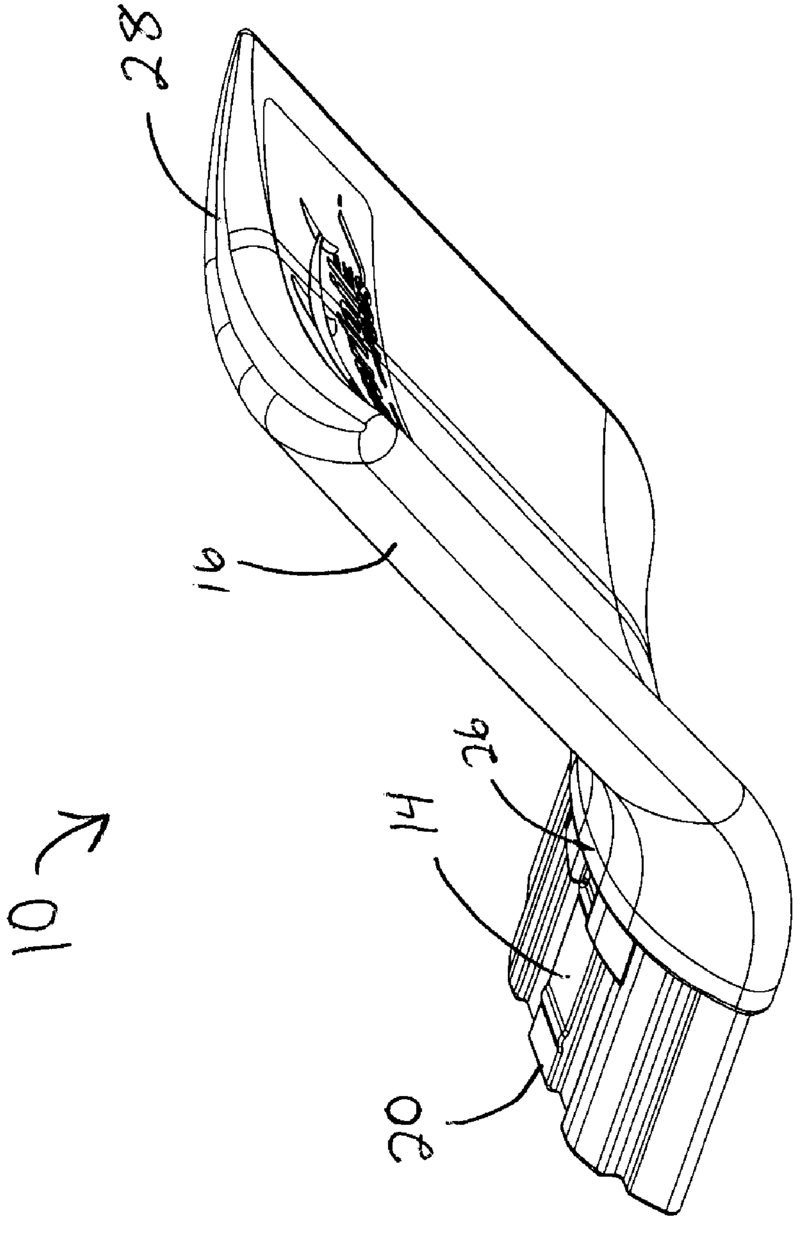
FIG. 2 is an alternate perspective view of the angled fan blade extension of FIG. 1.
Figure 6:
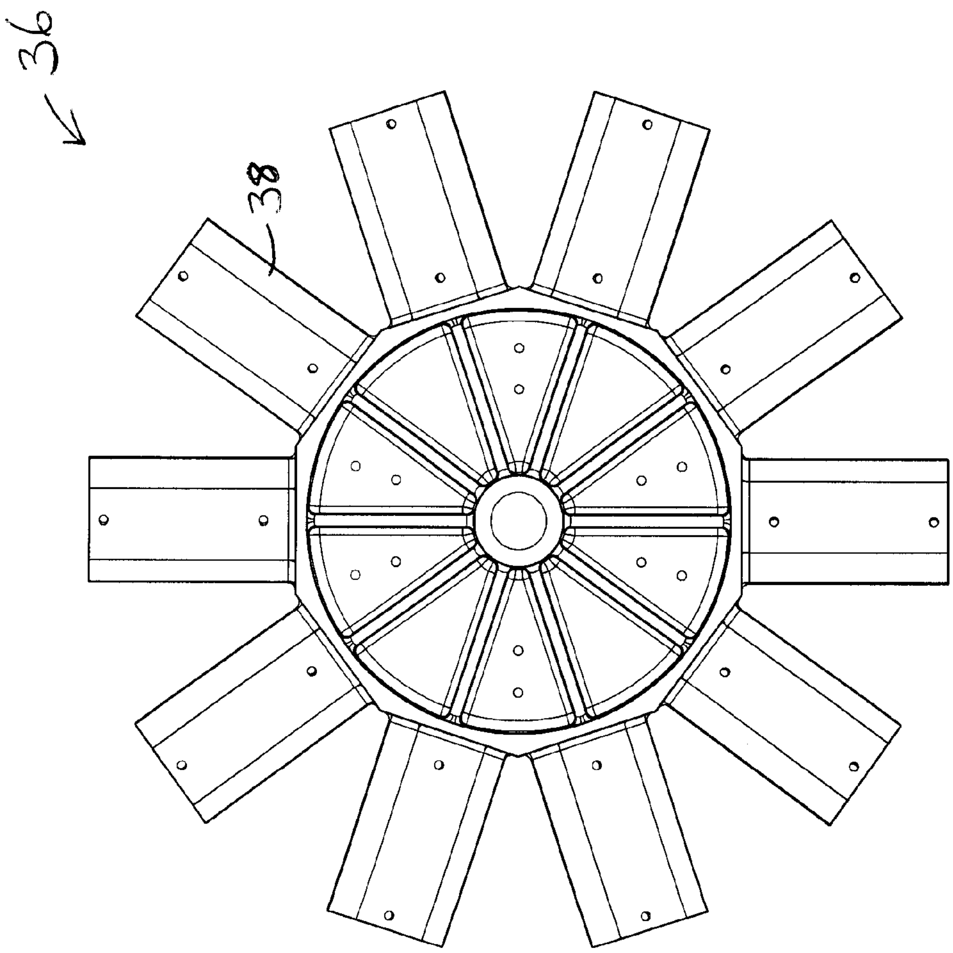
FIG. 6 is a plan view of a hub for mounting fan blades.
Figure 7:
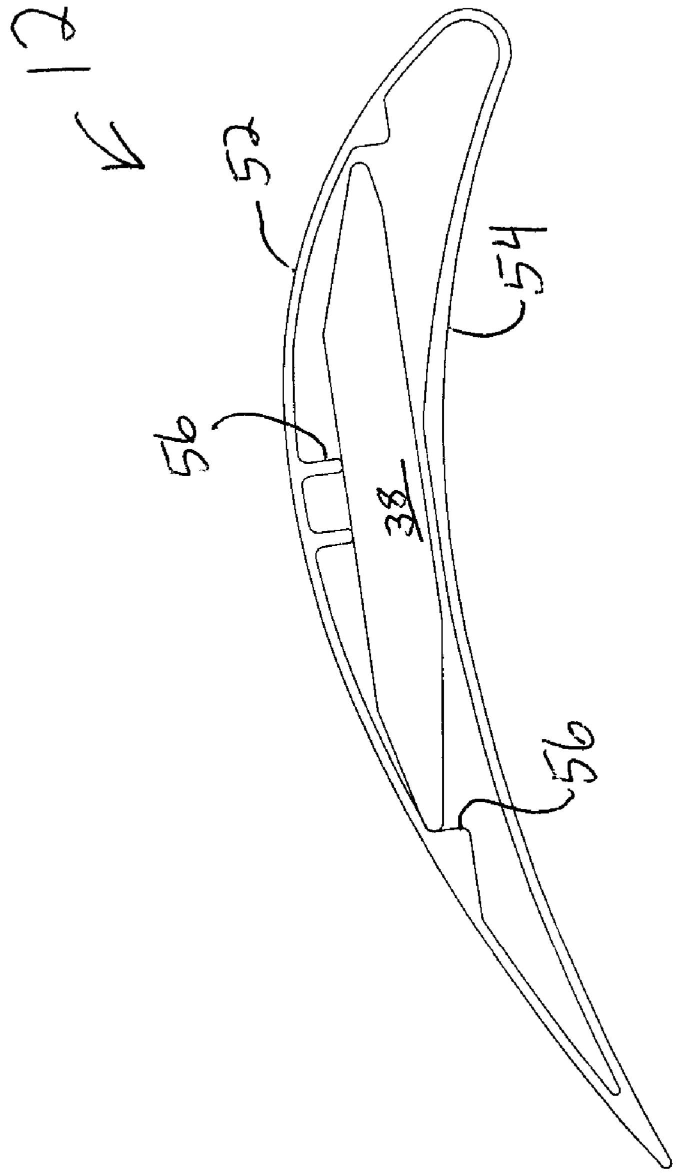
FIG. 7 is cross-sectional view of the exemplary fan blade of FIG. 4.

Referring now to the drawings in detail, wherein like numerals indicate the same elements throughout the views, FIGS. 1 and 2 show exemplary angled fan blade extension (10), which may be used with a fan (not shown) having one or more fan blades (12) in the form of airfoils. Referring to FIGS. 6 and 7, those of ordinary skill in the art will appreciate that a fan may generally comprise a hub portion (36), including a plurality of hub mounting members (38), to which one or more fan blades (12) may be mounted. Suitable examples of fans, hub portions (36), and fan blades (12) with which extensions (10) may be used are disclosed in the various patents, patent publications, and patent applications cited previously herein, though others may also be used.

Fan blade (12) of the present example is formed of extruded aluminum, though any other material(s) or methods of forming a fan blade (12) may be used. Fan blade (12) of the present example has an upper surface (52) with a generally elliptical curvature and a lower surface (54) with a generally elliptical curvature. Suitable methods of forming and elliptical configurations for a fan blade (12) are disclosed in U.S. Pat. No. 7,284,960, entitled "FAN BLADES," the disclosure of which is incorporated by reference herein. Alternatively, upper surface (52) and lower surface (54) may have any other suitable curvature or configuration. Fan blade (12) of the present example is also substantially hollow, and has a plurality of bosses (56) extending inwardly in the interior of fan blade (12). Bosses (56) are configured to engage mounting members (38) of hub portion (36) as shown in FIG. 7. Of course, a fan blade (12) may alternatively be substantially solid and/or may have any other suitable internal structures in addition to or in lieu of bosses (56). A fan blade (12) may also engage a hub portion (36) in any other desired fashion.

In the present example, angled fan blade extension (10) includes attachment portion (14) and angled portion (16). Attachment portion (14) has a proximal end (20) and a distal end (22). Angled portion (16) has a proximal end (26) and a distal end (28). The proximal end (26) of angled portion (16) is secured to the distal end (22) of attachment portion (14). In some versions, attachment portion (14) and angled portion (16) are formed separately, then joined together using fasteners (e.g. bolts, etc.), interlocking components or features, press fitting, adhesives, welding, or any other suitable devices, structures, or techniques. In some other versions, attachment portion (14) and angled portion (16) are formed as a unitary construction (e.g., molded as a homogenous continuum of material, etc.). Other ways in which attachment portion (14) and angled portion (16) may be formed will be apparent to those of ordinary skill in the art in view of the teachings herein. The proximal end (20) of attachment portion (14) is secured to the distal end (30) of fan blade (12) as described in greater detail below.

In some versions, the association of angled fan blade extension (10) to fan blade (12) provides a continuation of the cross sectional profile of fan blade (12). However, rather than continuing along the axis of fan blade (12), the association of angled fan blade extension (10) to fan blade (12) creates an upwardly curved angle configured to create a pattern of outward spread in the output airflow column. It will be appreciated by those of ordinary skill in the art that other angular orientations may be used. Along angled portion (16), the aerodynamic properties and angled orientation of angled portion (16) may tend to deflect the air downward and outward in a direction perpendicular to the axis of angled portion (16) of angled fan blade extension (10). Such a deflection may create an effect of an outwardly spreading column of air below the fan. Those of ordinary skill in the art will appreciate that other effects may be created in addition to or as an alternative to an outwardly spreading column of air below the fan. By way of example only, the angle of angled fan blade extension (10) may be such to similarly direct an outward flow of air at about the height of the fan. Also by way of example only, the angled fan blade extension (10) may be oriented such that the association of angled fan blade extension (10) to fan blade (12) creates a downwardly curved angle configured to create a pattern of inward spread in the output airflow column.

In some versions, the angle between fan blade (12) and angled portion (16) of angled fan blade extension (10) may have a tendency to disrupt vortices which form at distal end (28) of angled portion (16) of angled fan blade extension (10). This disruption of vortices may, to some extent, achieve the efficiency gains realized by the winglets described in U.S. Pat. No. 7,252,478 (incorporated by reference above). Angled fan blade extension (10) may also be formed with, fitted with, or otherwise include a winglet such as one described in U.S. Pat. No. 7,252,478.

Figure 4:
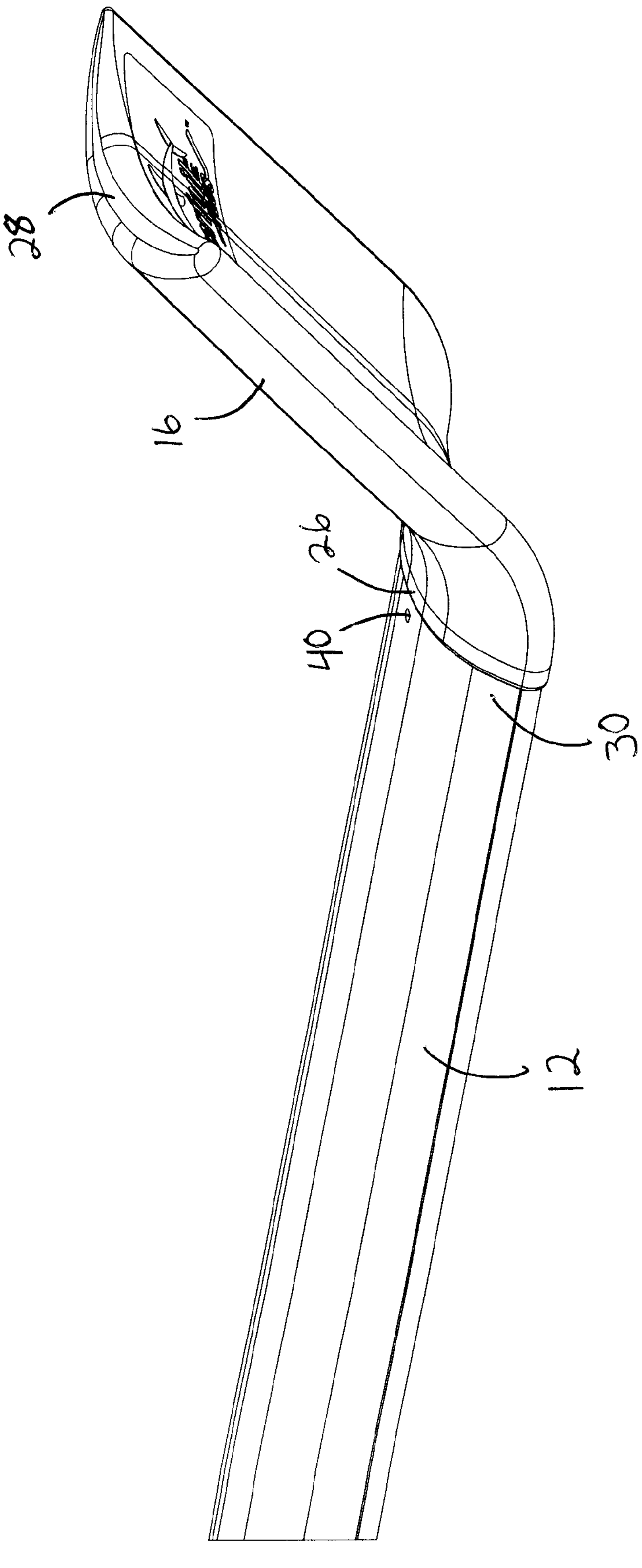
FIG. 4 is a perspective view of the angled fan blade extension of FIG. 1 installed on an exemplary fan blade.
Figure 5:
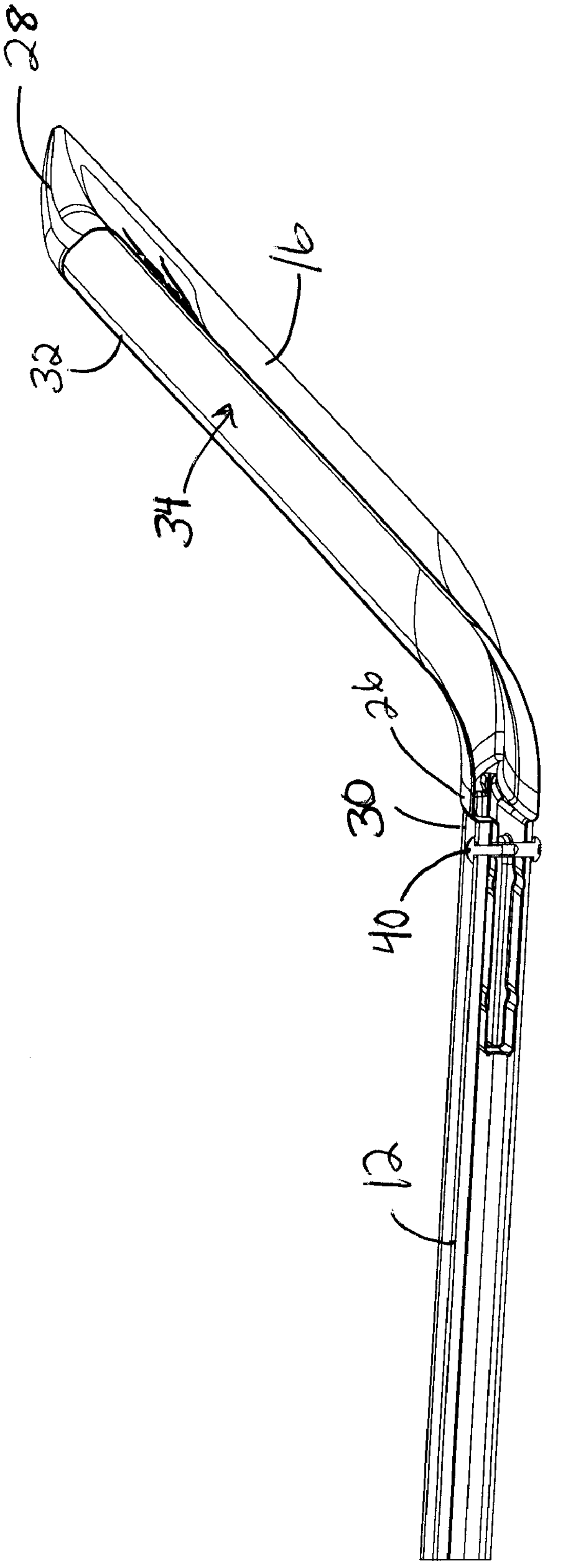
FIG. 5 is a cross-sectional view of the angled fan blade extension and fan blade of FIG. 4.

Now referring to FIGS. 4 and 5, in some versions, the angle between the axis of fan blade (12) and the axis of angled portion (16) of angled fan blade extension (10) may be between approximately 30 degrees, inclusive, and approximately 60 degrees, inclusive. For instance, the angle between the axis of fan blade (12) and the axis of angled portion (16) of angled fan blade extension (10) may be approximately 45 degrees. Alternatively, the angle between the axis of fall blade (12) and the axis of angled portion (16) of angled fan blade extension (10) may be between approximately 40 degrees, inclusive, and approximately 50 degrees, inclusive, between approximately 30 degrees, inclusive, and approximately 60 degrees, inclusive; between approximately 25 degrees, inclusive, and approximately 65 degrees, inclusive; between approximately 20 degrees, inclusive, and approximately 70 degrees, inclusive; or between approximately 10 degrees, inclusive, and approximately 80 degrees, inclusive. Of course, any other suitable angular relationships may be used.

In some versions, the length of angled portion (16) may be between approximately ¼ and approximately 1/12 of the length of associated fan blade (12), inclusive. Alternatively, any other suitable length relationships may be used.

In some versions, angled fan blade extension (10) is made of a lightweight polymer material to minimize its weight. Alternatively, any other suitable material or materials may be used, including but not limited to any suitable plastic, metal, composite, alloy, or combinations thereof.

Figure 3:
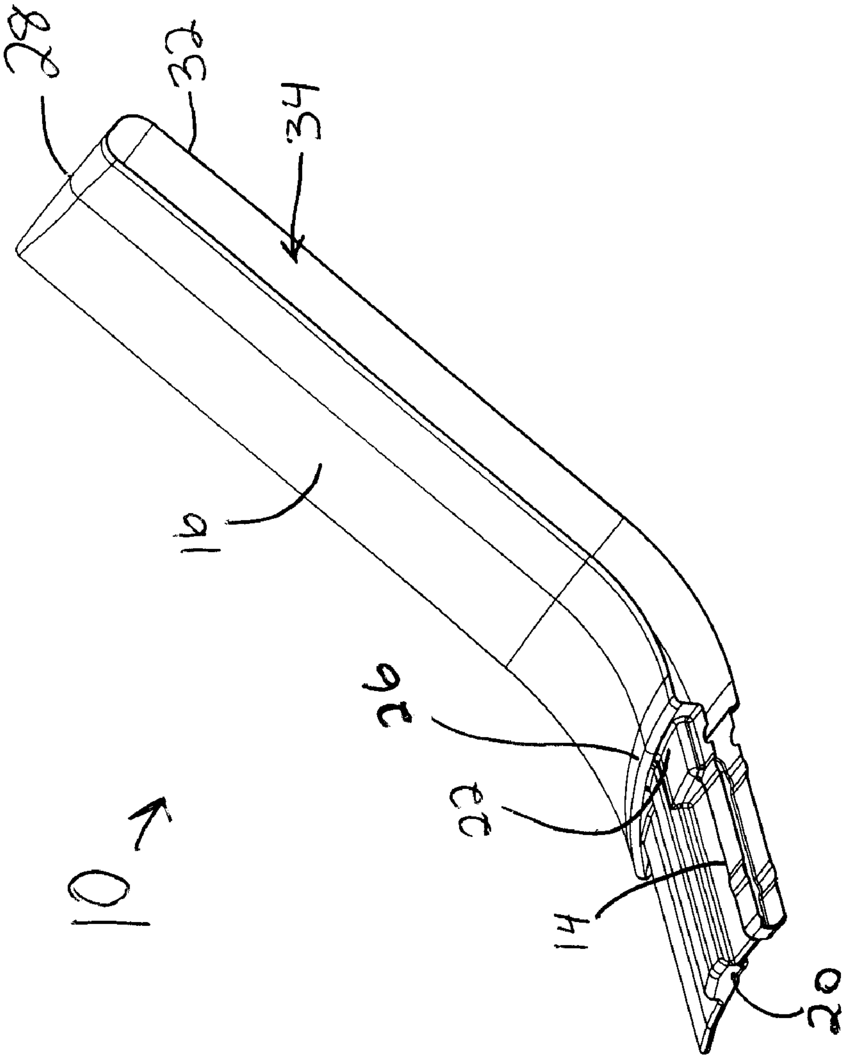
FIG. 3 is a cross-sectional view of the angled fan blade extension of FIG. 1.

Now referring to FIGS. 3 and 5, angled fan blade extension (10) may comprise a hollow form having a hollow space (34) defined by a relatively thin wall (32), to further minimize the weight of angled fan blade extension (10) while maintaining the full detail of the desired fan blade cross section form. Alternatively, angled fan blade extension (10) may be solid or have a substantially solid exterior and partially solid interior. It will also be appreciated that angled fan blade extension (10) may initially comprise a hollow form, with a material being used to fill the hollow form to any suitable degree.

The manufacturing process used in the production of angled fan blade extension (10) may include blow molding, rotational molding, injection molding, permanent mold casting, die-casting, stamping, welding, or any other suitable manufacturing process(es), including combinations thereof.

By way of example only, angled fall blade extension (10) may be used with a fan blade (12) having any of the various cross section forms described in U.S. Pat. No. 7,284,960, entitled "Fan Blades," filed Jan. 28, 2005, which is incorporated by reference herein, or any of those described in any of the other patents, patent publications, and patent applications cited previously herein. It will also be appreciated that angled fan blade extension (10) may have any suitable cross section form. For instance, at least a portion of an angled fan blade extension (10) may have a cross section form similar to the cross section form of a fan blade (12) to which it is secured. At least a portion of an angled fan blade extension (10) may also have a cross section form that differs from the cross section of a fan blade (12) to which it is secured. In addition, distal end (28) of angled portion (16) of angled fan blade extension (10) may be substantially flat, rounded (e.g. convex, etc.), tapered, or have any other suitable configuration. In the example shown in FIG. 2, angled portion (16) of angled fan blade extension (10) has an arcuate cross section form with a rounded distal end (28) of angled portion (16). For instance, angled fan blade extension (10) may have generally elliptical upper and lower surfaces, similar to fan blade (12).

In some versions, angled fan blade extension (10) is secured to fan blade (12) using any suitable technique. By way of example only, the end of fan blade (12) may be substantially hollow, and angled fan blade extension (10) may comprise attachment portion (14) configured to be inserted into the end of fan blade (12). Alternatively, the end of attachment portion (14) of angled fan blade extension (10) may be substantially hollow, and the end of fan blade (12) may be configured to be inserted into the end of attachment portion (14). For instance, attachment portion (14) may be modified to include a cuff, similar to the winglets described in U-S. Non-Provisional patent application Ser. No. 11/860,888, entitled "CUFFED FAN BLADE MODIFICATIONS," filed Sep. 25, 2007, the disclosure of which is incorporated by reference herein. Still yet, attachment portion (14) may be configured to slide over a portion of the end of fan blade (12) to establish connectivity. Furthermore, angled fan blade extension (10) may lack an attachment portion (14) altogether. For instance, angled portion (16) may be secured directly to fan blade (12) by separately forming angled portion (16) and fan blade (12), then joining them together using fasteners (e.g. bolts, etc.), interlocking components or features, press fitting, adhesives, welding, or any other suitable devices, structures, or techniques. In some other versions that lack an attachment portion (14) altogether, angled portion (16) and fan blade (12) may be formed as a unitary construction (e.g., molded as a homogenous continuum of material, etc.). Other suitable engagement configurations and relationships will be apparent to those of ordinary skill in the art.

It will also be appreciated that one or more fasteners may be used to secure attachment portion (14) to fan blade (12), including but not limited to one or more pins, screws, bolts, adhesives, nails, welds, etc. In the present example, a screw post fastener (40) is used to secure attachment portion (14) to fan blade (12). In yet another version, fan blade (12) and attachment portion (14) of angled fan blade extension (10) are integrally formed of a homogenous continuum of material. For instance, angled fan blade extension (10) may simply comprise the distal end (30) of fan blade (12) bent upward. It will be appreciated by those of ordinary skill in the art that such a bent configuration may include bending the distal end (30) of fan blade (12) in a variety of directions to achieve the desired angular configuration.

In some versions of angled fan blade extension (10), attachment portion (14) has substantially flat upper and lower surfaces (e.g., defining substantially flat, substantially parallel planes, etc.). For instance, attachment portion (14) may be configured similar to mounting members (38) of hub portion (36). Alternatively, as shown in FIGS. 1-3, attachment portion (14) may have a center region and/or upper and lower surfaces having a curvature that is substantially similar to or complements a curvature of one or both fan blade (12) surfaces (52, 54). For instance, upper and lower surfaces of attachment portion (14) may each have a generally elliptical curvatures; and/or a center region of attachment portion (14) may have a generally elliptical curvature. Furthermore, upper and lower surfaces of attachment portion, regardless of whether they are curved or substantially flat, may also include one or more recesses, relief features, or other features configured to engage with bosses (56) inside fan blade (12). In some versions, a pattern of thicker and thinner sections across attachment portion (14) may provide additional stiffness and/or resistance to crushing. Other suitable configurations and features for an attachment portion (14) will be apparent to those of ordinary skill in the art in view of the teachings herein.

Having shown and described various versions of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. An extension for a fan blade, wherein the fan blade has a concave lower surface and a convex upper surface, the extension comprising:

(a) an attachment member, and (b) an angled member having a proximal end and a distal end, wherein the angled member is integrally coupled to and extends from the attachment member at the proximal end of the angled member, such that the attachment member and the angled member together form a homogeneous continuum of material, the angled member comprising:

i. a concave lower surface, and ii. a convex upper surface, wherein the attachment member is configured to substantially engage a fan blade first end, wherein a portion of the proximal end of the angled member abuts the fan blade first end when the attachment member is substantially engaged with the fan blade first end, wherein the concave lower surface of the fan blade and the concave lower surface of the angled member substantially align when the angled member abuts the fan blade first end, wherein the fan blade is configured to be mounted to a fan hub at a second end of the fan blade, the second end being opposite the first end, and wherein the angled member extends from the attachment member at a non-perpendicular, non-parallel angle relative to the fan blade.

2. The extension for a fan blade of claim 1, wherein the attachment member is insertable into an open end of the fan blade first end.

3. The extension for a fan blade of claim 1, wherein the attachment member is connected to the fan blade first end by sliding over a portion of the fan blade first end.

4. The extension for a fan blade of claim 1, wherein the attachment member is connected to the fan blade first end by a fastening device selected from the group consisting of one or more pins, screws, bolts, adhesives, nails, clips, welds, and combinations thereof.

5. The extension for a fan blade of claim 1, wherein the attachment member is connected to the fan blade first end in a substantially planar configuration.

6. The extension for a fan blade of claim 1, wherein the angled member creates an angle relative to the fan blade between 30 degrees and 60 degrees.

7. The extension for a fan blade of claim 1, wherein the angled member has a length between ¼ and 1⁄12 of the length of the fan blade.

8. The extension for a fan blade of claim 1, wherein the cross section form of the angled member is substantially the same as a cross section form of the fan blade.

9. The extension for a fan blade of claim 1, wherein the angled member includes a distal end, wherein the distal end is rounded.

10. The extension for a fan blade of claim 1, wherein the angled member includes a substantially hollow portion.

11. The extension for a fan blade of claim 1, constructed from a process selected from the group consisting of blow molding, rotational molding, injection molding, permanent mold casting, die-casting, stamping, welding, and combinations thereof.

12. The extension for a fan blade of claim 1, wherein the fan blade defines an airfoil shape, and wherein the angled member defines an airfoil shape complementing the airfoil shape of the fan blade.

* * * * *